Nov. 19, 1968  A. G. CANOY  3,411,483
METHOD AND APPARATUS FOR LOW TEMPERATURE
BRANDING OF ANIMALS
Filed Dec. 19, 1966  2 Sheets-Sheet 1
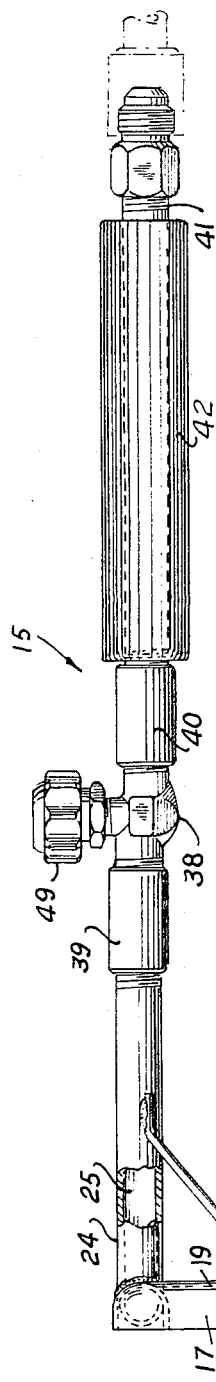
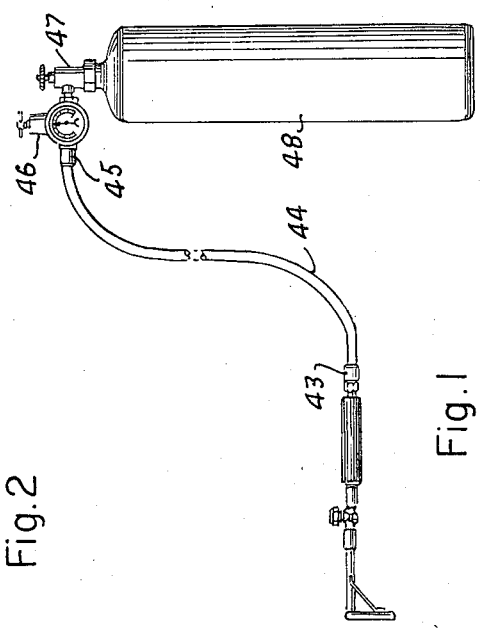
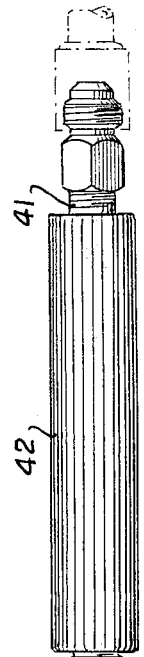
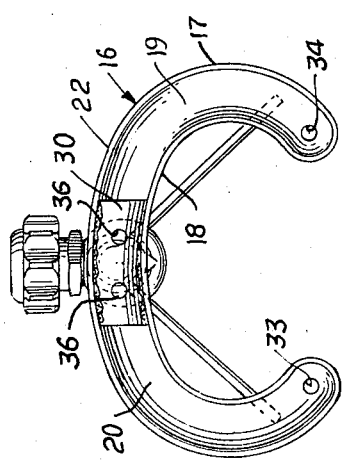
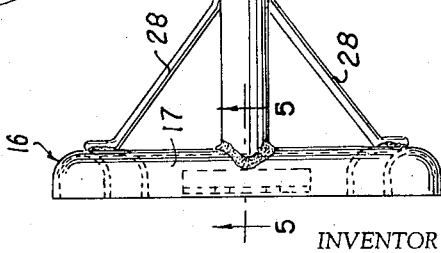
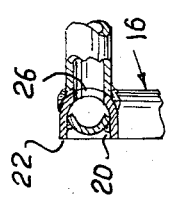
INVENTOR
Albert G. Canoy
BY
ATTORNEYS Nov. 19, 1968
A. G. CANOY
3,411,483
METHOD AND APPARATUS FOR LOW TEMPERATURE
BRANDING OF ANIMALS
Filed Dec. 19, 1966
2 Sheets-Sheet 2
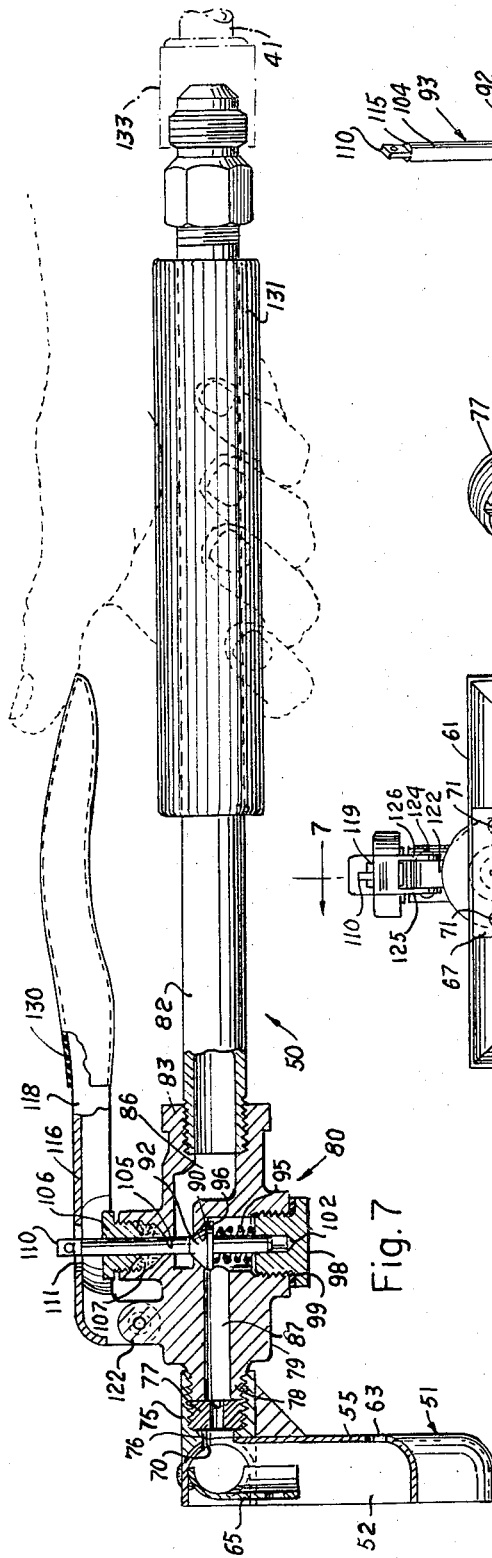
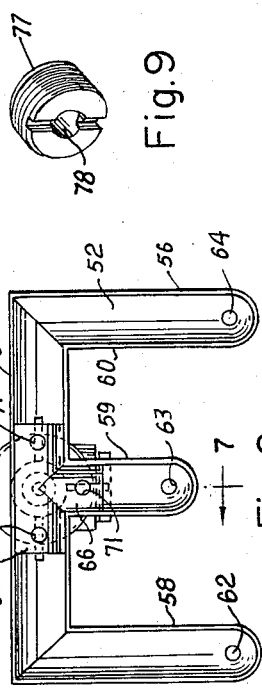
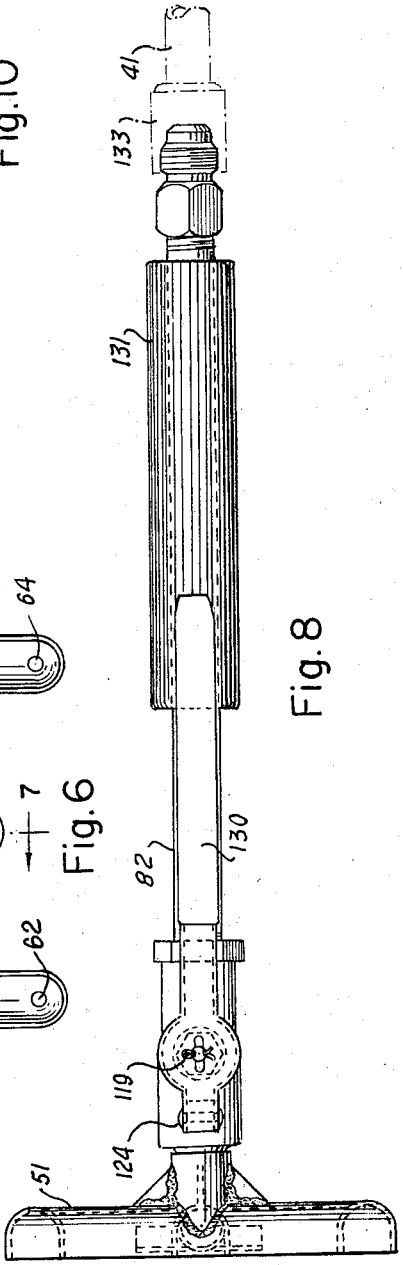
INVENTOR
Albert G. Canoy
BY *Hastings Ackley
and
Walter J. Jay*
ATTORNEYS 3,411,483
METHOD AND APPARATUS FOR LOW TEMPERATURE BRANDING OF ANIMALS
Albert G. Canoy, 1003 College Circle,
Carthage, Tex. 75633
Filed Dec. 19, 1966, Ser. No. 602,775
8 Claims. (Cl. 119—1)

ABSTRACT OF THE DISCLOSURE

A branding device which brands an animal by changing the color of the hair of an animal growing in an area of predetermined configuration and also scars animal skin in such area without causing depilation by subjecting such area of the hide of the animal to a gas having a very low temperature for a short period of time and a method of branding an animal by circulating cold gas over a predetermined area of the animal hide to produce physiologic changes in the skin in such area.

---

This invention relates to a method of branding animals and to branding devices and more particularly to a branding device for branding animals with predetermined brands which does not cause depilation of the hide at the location of the brand.

An object of this invention is to provide a new and improved branding device which causes scarring of the skin of the animal over a predetermined area and a change in the color of the hair growing in such area.

Another object is to provide a branding device having means for quickly cooling a predetermined area of the hide of an animal to cause the skin within such area to be scarred and the color of hair growing in such area to change color permanently.

Still another object of the invention is to provide a branding device having means subjecting a predetermined area of the hide of an animal to a cold gas to cause a quick cooling of the hide of the animal in such area.

Still another object is to provide a branding device having a channel member of a desired configuration, such as a letter, which may be pressed against the hide of an animal at a desired location and having means for supplying a very cold gas to such channel to cool and perhaps even freeze the outer layers of the skin of the animal within the edges of the channel member defining its channel, so that the hair of the animal thereafter will change color and the skin will be scarred.

A further object is to provide a branding device whereby the cold gas is obtained by permitting the liquid gas, such as propane, to evaporate and flow into the channel.

Additional objects and advantages of the invention will be readily apparent from the reading of the following description of a device constructed in accordance with the invention, and reference to the accompanying drawings thereof, wherein:

FIGURE 1 is a view of the branding device embodying the invention connected by a flexible conduit to a tank of liquified gas;

FIGURE 2 is a side view of the branding device;

FIGURE 3 is an end view of the branding device;

FIGURE 4 is a top view of the branding device;

FIGURE 5 is a fragmentary, partly sectional view of the branding device taken on line 5—5 of FIGURE 4;

FIGURE 6 is an end view of a modified form of the branding device embodying the invention;

FIGURE 7 is a side view, with some parts taken in section along line 7—7 of FIGURE 6, of the branding device illustrated in FIGURE 6;

FIGURE 8 is a top view of the branding device;

FIGURE 9 is a perspective view of a bean for controlling the rate of flow of the gas to the channel member; and FIGURE 10 is a view of a valve member of the device illustrated in FIGURES 1 through 8.

Referring now particularly to FIGURES 1 through 5 of the drawings, the branding device 15 includes a channel member 16 having side portions 17 and 18 connected by a web portion 19. The channel member defines a channel 20 of a desired configuration as, for example, of the letter "C." The channel member has a continuous outer or front edge 22 defining such channel with the edge being adapted to be pressed against the body of an animal to be branded. The edge 22 lies in a single plane. The channel member is mounted on the end of a base member 24, as by welding, whose longitudinal passage 25 opens through an inlet port 26 in the web of the channel member to the channel 22. A pair of brace rods 28 may be rigidly secured to the base member and the channel member to add rigidity to the outer ends of the channel member.

A baffle plate 30 is rigidly mounted, as by welding, in the channel member between its side portions 17 and 18 immediately over its inlet port 26 in order to guide the flow of the gas towards the opposite ends of the channel so that the gas will then flow outwardly through the vent holes 33 and 34 in the opposite ends of the channel member. The baffle is provided with a pair of apertures 36 spaced outwardly of the port 26 and between the inlet port and the vent holes so that the gas will also flow through the apertures outwardly in the portion of the channel located outwardly of the baffle 30.

The base member 24 is connected to the outlet end of an operator valve by a fiting 39, the inlet end of the valve being connected by a fitting 40 to a hollow handle 41 which is provided with a cover or sheath 42 of a substance such as nylon, rubber, or the like, having a low coefficient of thermal conductivity. The handle is connectable by a suitable coupling or fitting 43 to the outlet end of a flexible conduit or hose 44 whose inlet end is connected by suitable means, such as a fitting 45 and a pressure regulating valve 46, to the outlet end of a shut-off valve 47 which controls flow of gas from the tank 48. Liquified gas, which has a very low temperature of evaporation, such as propane, is stored in the tank. The operator valve is operable by means of its handle 49.

In use, the channel member is pressed against the hide of the animal at a desired location so that its peripheral continuous edge 22 at all locations therealong firmly engages the hide of the animal so that very little or no gas will escape outwardly between the hide and the edge. The operator valve is then opened and the gas evaporates in the tank 48 and flows from the tank at a pressure predetermined by the pressure regulator valve into the flexible conduit, thence through the hollow handle to the passage 25 of the base member 24 of the branding device and then through the inlet port 26 into the channel 20 which is now closed by the hide of the animal. The baffle plate 30 now causes the gas to flow at a substantially uniform velocity through the channel towards the vent holes 33 and 34, so that all areas of the animal's hide within the edges 22 of the channel members are exposed to substantially the same rate of flow and, therefore, are cooled at a substantially uniform rate. The gas expands and absorbs heat as it flows in opposite directions toward the ports 33 and 34 and thence outwardly to the atmosphere. The gas flowing through the channel is very cold since liquid propane boils at a temperature of minus 44 degrees Fahrenheit and a very rapid flow of heat from the hide occurs. The operator valve is held open a period of time sufficiently long to permit the skin of the animal throughout the area within the edge 22 of the channel member to be so treated, due to the rapid flow of heat therefrom, that physiologic changes occur therein which will cause scarring of the hide and subsequent discoloration of the hair growing from the particular area of the skin. The outer layers of the skin may actually freeze. The operator valve is then closed and the branding device is moved out of contact with the hide of the animal. The hair will continue to grow in this area, since no depilation is caused by use of the branding device, and only a change in the color of the hair growing within the area so treated occurs.

It will be apparent that no open wounds or scars are formed by the use of this method of branding in contradistinction to the usual conventional method of branding in which hot branding irons are used to burn the hair and the skin and cause the branded area of the skin to be exposed to insects and the like.

It will also be apparent that the branding device permits easy and quick branding of the animal merely by the use of a squeeze gate, or even by merely holding the animal against a fixed structure, since any pain to the animal appears to be slight and the treatment requires only a few seconds to complete.

Referring now particularly to FIGURES 7 through 10 of the drawings, the branding device 50 is of a preferred form and includes a channel member 51 of a desired brand configuration, in the present instance, in the form of a letter E, whose outwardly opening channel 52 is defined by the side portions 53 and 54 which are connected by the web portion 55 of the channel member. The continuous peripheral edge 56 of the channel member extends in a single plane. The portions 58, 59 and 60 of the channel member, which define the three horizontal portions of the letter E, and which extend from the connector or vertical portion 61 of the letter, are provided with vent holes or ports 62, 63, and 64, respectively. A baffle plate 65 of substantially T-shape has a leg portion 66 disposed in the middle portion 59 of the channel web and a portion 67 disposed in the connector portion 61 of the channel member and over the inlet port 70 of the channel member in any suitable manner, as by welding. The baffle member 65 has apertures 71 spaced from the inlet port 70 so that the cold gas will flow outwardly of the baffle plate in the outer portion of the channel to insure that the hide of the animal throughout all portions of the letter defined by the continuous peripheral edge 56 of the channel member will have cold gas flowing therepast. A base member 75 is rigidly connected to the channel member, as by welding, and its passage 76 is in communication with the inlet port of the channel member. A bean 77 having a passage 78 of restricted orifice is threaded in the outer portion of the passage of the base member.

The reduced outlet end portion 78 of the body 79 of an operator valve 80 is threaded in the enlarged portion of the passage. The outlet end of a hollow handle 82 is threaded in the inlet end portion 83 of the valve body. The valve body has a partition 85 between its inlet and outlet passages 86 and 87, respectively, and has a port therethrough for establishing communication between the inlet and outlet passages. The seat 90 which defines the port is engageable by the seat surface 92 of a valve member 93 which is biased toward the closed position illustrated in FIGURE 7 by a spring 95 whose top end portion engages the downwardly facing shoulder 96 of the valve and whose bottom portion engages the top end surface of a closure plug 98 threaded in the lower portion of the transverse bore 99 of the valve body. The valve member has a dependent stem portion which extends through the spring into an upwardly opening bore 102 of the closure plug. The valve member also has an upper stem portion 104 which extends upwardly through a passage 105 of the valve body and a closure plug 106 which is threaded in the upper enlarged portion of the passage. The closure plug or gland nut compresses a seal substance or packing 107 which seals between the upper stem portion and the valve body.

The upper stem portion has a flat end portion 110 which extends through an elongate slot 111 of an operator handle 112 from upwardly facing shoulders 115 of the stem portion which are engageable by the web 116 of the channel shaped handle 118 on opposite sides of the slot to limit downward movement of the handle relative to the valve member. A cotter pin 119 which extends through an aperture 120 of the flat portion 110 limits upward movement of the handle relative to the valve member.

The forward end of the handle is pivotally secured to an upwardly extending lug 122 of the valve body by a suitable rivet or pin 124 which extends through aligned apertures in the parallel flanges 125 and 126 of the handle. The rear end of the operator handle is provided with a cover 130 of a heat insulating substance and the hollow handle 82 is similarly covered by a sheath 131, also of a heat insulating substance. The rear end of the hollow handle is connectable to the flexible conduit 41 which extends to a source of liquid propane or other gas having a low temperature of evaporation by means of a suitable fitting 133. The provision of the bean 77 assures that the expansion of the evaporated gas is at a maximum close to the location of entry of gas into the channel 52 of the channel member 51 so that more efficient utilization of the gas is provided than in the case of the branding device 20.

It will be apparent that the branding device 50 is employed in the same manner as the branding device 20, the channel member 51 being placed against the animal at the location at which it is desired that the brand be made with the edge 56 thereof held firmly against the hide of the animal. The rear end of the operator handle is then depressed to cause the operator valve 80 to permit flow of the gas from its inlet passage 86 to its outlet passage 87. The gas then flows through the restricted orifice of the bean and the inlet port 70 of the channel member into the channel 52, where it is caused by the baffle member 65 to flow through all portions of the channel 55 to the vent holes 62, 63 and 64. The orifices of these vent holes may be varied as required to insure that all portions of the hide of the animal at all locations exposed to the channel 52 are cooled at the same rate. The operator handle is released and the spring 95 then moves the valve member back to its closed position after the hide of the animal has been treated for a period of time sufficiently long to cause the desired physiologic change to occur in the portion of the hide exposed to the channel 51.

It will now be seen that in both forms of the branding device, it includes a channel member providing a channel which is closed by the hide of an animal when the device is applied thereto through which cold and expanding gas is circulated to very quickly cool the hide in such area.

It will also be seen that a new and improved method of branding animals has been described which includes outlining an area of predetermined configuration on the hide of an animal, as by pressing the channel member against the hide of an animal, then circulating cold and expanding gas over such area whose temperature is below 32 degrees Fahrenheit to cause rapid flow of heat from the hide within such area whereby the skin of an animal is scarred and the color of the hair growing within such area is permanently changed.

It will further be seen that the gas expands as it flows through the channel since the channel is provided with vent holes through which the gas may escape to the atmosphere and since, especially in the case of the branding device 50, the effective orifice of the vent holes is substantially greater than the orifice of the inlet means through which the gas is delivered to the channel.

The foregoing description of the invention is explanatory only, and changes in the details of the construction illustrated may be made by those skilled in the art, without departing from the spirit of the invention.

What is claimed and desired to be secured by Letters Patent is:

1. A device for branding animals including: a channel member providing a forwardly opening channel having the configuration of a predetermined brand, said channel member having a continuous forward edge for engaging the hide of an animal whereby when said channel member is pressed against the hide of an animal with said edge engaging the animal, said channel is closed by the hide of the animal, said channel member having rearwardly opening inlet means; means secured to said channel member for supplying low temperature gas through said inlet means into said channel, said channel member having vent means spaced from said inlet means and opening from said channel to the exterior of said channel member for permitting gas introduced into said channel through said inlet means to flow from said inlet means to said vent means through substantially all portions of said channel when said channel member is held against the hide of an animal to cause the hide lying within said edge to be cooled by the gas flowing through said channel.

2. The device in claim 1, wherein said device includes a baffle means disposed in said channel spaced from said edge and said inlet means and positioned therebetween for preventing direct outward flow of gas from said inlet means to the hide of an animal adjacent said inlet means.

3. The device of claim 2, wherein said vent means includes a plurality of vent ports spaced from one another and said inlet means, said inlet means being positioned between any pair of said vent ports.

4. The branding device of claim 1, wherein said means for supplying gas to said inlet means includes a tubular base member extending rearwardly from and secured to said channel member and having a passage opening to said channel, and conduit means including a rigid tubular handle rigid with said base member connected to said base member and connectable to a reservoir of liquified gas.

5. The branding device of claim 4, and valve means connected in said conduit means between said base member and said handle for controlling flow of gas to said base member.

6. The branding device of claim 5, and orifice means secured to said base member adjacent said inlet means and providing a restricted orifice for gas flowing through said base member to said inlet means.

7. The device of claim 6, and baffle means disposed in said channel spaced from said edge and said inlet means and positioned therebetween, said baffle means have ports therethrough spaced from and out of alignment with said inlet means.

8. The method of branding animals by changing the color of hair growing in a predetermined area which includes outlining an area of the skin with an inverted gas containing enclosure having a predetermined configuration and then circulating a cold gas whose temperature is below 32 degrees Fahrenheit through said enclosure and over said area to cause rapid transfer of heat from the skin and cause permanent physiologic hair color changes in the skin within such area:

References Cited

UNITED STATES PATENTS

| 2,153,289 | 4/1939 | Wyman | 158—14 |
| 2,177,180 | 10/1939 | James | 158—14 |
| 2,645,097 | 7/1953 | Posch | 62—293 |
| 2,982,112 | 5/1961 | Keyes | 62—293 |
| 3,000,195 | 11/1961 | Federighi | 62—64 X |
| 3,190,081 | 6/1965 | Pytryga | 128—303.1 X |
| 3,259,131 | 7/1966 | Kanbar et al. | 128—303.1 |
| 3,272,203 | 9/1966 | Chato | 128—303.1 |

OTHER REFERENCES

"Freeze Branding Livestock"—Doane's Agricultural Report, July 16, 1966, vol. 29, No. 20–5, pp. 249 and 250. 250.

A. Cecil Taylor; "Survival Of Rat Skin And Changes In Hair Pigmentation Following Freezing," Journal of Experimental Zoology (1949), pp. 78–81, 94, 95 and 98.

ALDRICH F. MEDBERY, *Primary Examiner.*